US009930562B2

United States Patent
Lumbatis (10) Patent No.: US 9,930,562 B2
(45) Date of Patent: Mar. 27, 2018

(54) UTILIZATION BASED CONTROL OF WIRELESS NETWORK SERVICES

(71) Applicant: ARRIS Enterprises LLC, Suwanee, GA (US)

(72) Inventor: Kurt Alan Lumbatis, Dacula, GA (US)

(73) Assignee: ARRIS Enterprises LLC, Suwanee, GA (US)

( * ) Notice: Subject to any disclaimer, the term of this patent is extended or adjusted under 35 U.S.C. 154(b) by 148 days.

(21) Appl. No.: 15/017,063

(22) Filed: Feb. 5, 2016

(65) Prior Publication Data
US 2017/0230858 A1    Aug. 10, 2017

(51) Int. Cl.
*H04W 28/02* (2009.01)
*H04W 48/06* (2009.01)

(52) U.S. Cl.
CPC ... *H04W 28/0247* (2013.01); *H04W 28/0289* (2013.01); *H04W 48/06* (2013.01)

(58) Field of Classification Search
None
See application file for complete search history.

(56) References Cited

U.S. PATENT DOCUMENTS

| | | | |
|---|---|---|---|
| 2007/0110035 A1* | 5/2007 | Bennett | H04L 12/2898 370/352 |
| 2007/0217436 A1 | 9/2007 | Markley et al. | |
| 2008/0117836 A1 | 5/2008 | Savoor et al. | |
| 2010/0109901 A1* | 5/2010 | Martin-Cocher | G06Q 30/0251 379/45 |
| 2013/0225181 A1 | 8/2013 | Radulescu et al. | |
| 2015/0146522 A1 | 5/2015 | Lau et al. | |
| 2015/0334602 A1* | 11/2015 | Hencinski | H04W 84/12 370/338 |

OTHER PUBLICATIONS

PCT Search Report & Written Opinion, Re: Application No. PCT/US2017/015036, dated May 12, 2017.

* cited by examiner

*Primary Examiner* — Diane Lo
(74) *Attorney, Agent, or Firm* — Bart A. Perkins (57) ABSTRACT

Methods, systems, and computer readable media can be operable to facilitate dynamic provisioning of subordinate service sets. An access point providing primary service(s) and subordinate service(s) may determine the bandwidth available for the subordinate service(s) based on current channel utilization. Where the bandwidth available for the subordinate service(s) is determined to be less than a predetermined threshold, the access point may modify support for the subordinate service(s). The access point may reduce the number of clients allowed to access the subordinate service(s) or may temporarily suspend offering of the subordinate service(s) to client devices.

20 Claims, 5 Drawing Sheets

UTILIZATION BASED CONTROL OF WIRELESS NETWORK SERVICES

TECHNICAL FIELD

This disclosure relates to managing the offering of service sets on a wireless network.

BACKGROUND

One or more access points may be installed at a subscriber premise to provide a subscriber with a local network such as a wireless local area network (WLAN) for accessing multiple services that are delivered to the subscriber premise. Generally, multiple devices may be connected to the local network, and each of the multiple devices may simultaneously consume resources of the access point while receiving one or more services. The one or more access points may communicate with the multiple devices using wireless communications passed over one or more channels. A channel used for delivering communications between an access point and a client device may have limited bandwidth for carrying communications.

An access point may provide a plurality of service sets wherein each service set is designated for use to provide certain services. A client device may detect the service sets offered by an access point and may join a specific service set based on the service that the client device is requesting. For example, service sets may be designated for delivery of encrypted communications over a password-protected, private network, communications associated with a security system, or communications associated with a public network (e.g., unencrypted or encrypted hotspot network). When a WLAN provided by an access point becomes congested, all communications delivered over all service sets provided by the access point may suffer from the congestion. However, a user may deem the delivery of certain services to be more important than the delivery of certain other services. Therefore, it is desirable to improve upon methods and systems for allocating network resources to service sets.

BRIEF DESCRIPTION OF THE DRAWINGS

Like reference numbers and designations in the various drawings indicate like elements.

DETAILED DESCRIPTION

Methods, systems, and computer readable media can be operable to facilitate dynamic provisioning of subordinate service sets. An access point providing primary service(s) and subordinate service(s) may determine the bandwidth available for the subordinate service(s) based on current channel utilization. Where the bandwidth available for the subordinate service(s) is determined to be less than a predetermined threshold, the access point may modify support for the subordinate service(s). The access point may reduce the number of clients allowed to access the subordinate service(s) or may temporarily suspend offering of the subordinate service(s) to client devices.

An embodiment of the invention described herein may include a method comprising: (a) determining an available bandwidth for subordinate services, wherein subordinate services are provided to one or more devices over one or more service sets designated for the provisioning of subordinate services; (b) comparing the available bandwidth for subordinate services to a predetermined threshold bandwidth; and (c) if the available bandwidth for subordinate services is less than the predetermined threshold bandwidth, modifying support for one or more of the service sets designated for the provisioning of subordinate services.

According to an embodiment of the invention, modifying support for one or more of the service sets designated for the provisioning of subordinate services comprises reducing the number of client devices that are allowed to join one or more of the service sets designated for the provisioning of subordinate services.

According to an embodiment of the invention, the number of client devices allowed to join one or more service sets designated for the provisioning of subordinate services is determined based upon the difference between the available bandwidth for subordinate services and the predetermined threshold bandwidth, and is further based upon an average bandwidth consumption by a client device accessing a subordinate service.

According to an embodiment of the invention, modifying support for one or more of the service sets designated for the provisioning of subordinate services comprises suspending support for one or more of the service sets designated for the provisioning of subordinate services.

According to an embodiment of the invention, suspending support for one or more of the service sets designated for the provisioning of subordinate services comprises suspending the transmission of advertisement messages comprising one of more service set identifiers associated with one or more of the service sets designated for the provisioning of subordinate services.

According to an embodiment of the invention, determining the available bandwidth for subordinate services comprises: (a) determining a maximum bandwidth available to an access point; (b) determining a bandwidth consumed by the access point in the provisioning of primary services over one or more primary service sets; (c) determining a level of interference on a wireless channel being used by the access point to deliver services to one or more devices; and (d) wherein the determination of the available bandwidth for subordinate services is based upon the difference between the maximum bandwidth available to the access point and the bandwidth consumed by the provisioning of primary services, and is further based upon the level of interference on the wireless channel.

According to an embodiment of the invention, the determination of the available bandwidth for subordinate services is made at a server upstream from an access point offering the one or more service sets designated for the provisioning of subordinate services.

An embodiment of the invention described herein may include an apparatus comprising: (a) one or more interfaces configured to be used to transmit and receive communications delivered over one or more subordinate service sets designated for the provisioning of subordinate services and communications delivered over one or more primary service sets designated for the provisioning of primary services; and (b) one or more modules configured to: (i) determine an available bandwidth for delivering the subordinate services to one or more client devices; (ii) compare the available bandwidth for delivering the subordinate services to a predetermined threshold bandwidth; and (iii) if the available bandwidth for delivering the subordinate services is less than the predetermined threshold bandwidth, modify support for one or more of the service sets designated for the provisioning of subordinate services.

An embodiment of the invention described herein may include one or more non-transitory computer readable media having instructions operable to cause one or more processors to perform the operations comprising: (a) determining an available bandwidth for subordinate services, wherein subordinate services are provided to one or more devices over one or more service sets designated for the provisioning of subordinate services; (b) comparing the available bandwidth for subordinate services to a predetermined threshold bandwidth; and (c) if the available bandwidth for subordinate services is less than the predetermined threshold bandwidth, modifying support for one or more of the service sets designated for the provisioning of subordinate services.

Figure 1:
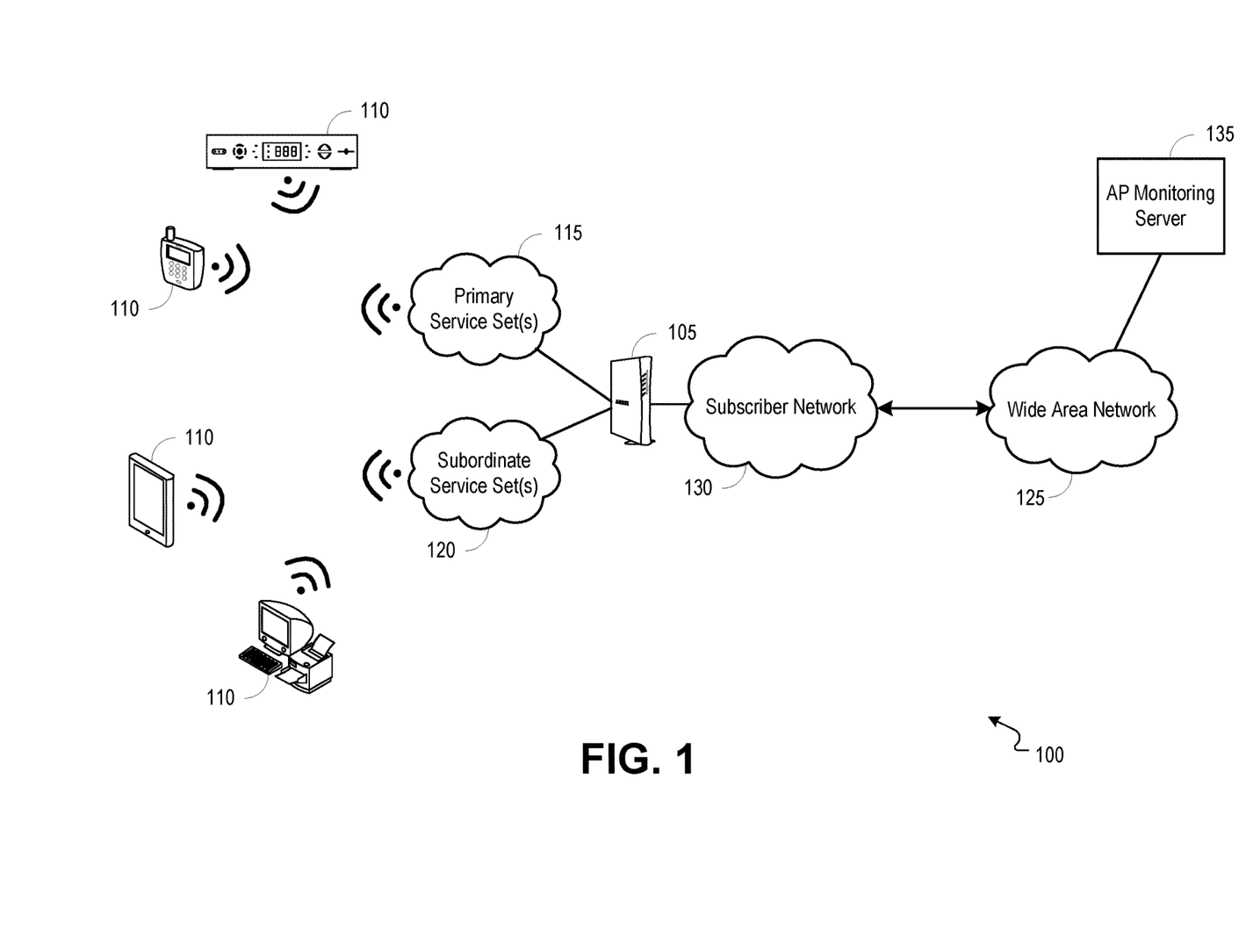
FIG. 1 is a block diagram illustrating an example network environment operable to facilitate dynamic provisioning of subordinate service sets.

FIG. 1 is a block diagram illustrating an example network environment 100 operable to facilitate dynamic provisioning of subordinate service sets. In embodiments, an access point 105 can route communications to and from one or more client devices 110. For example, the one or more client devices 110 can be provisioned to receive video service(s), data service(s), voice service(s), and/or home security service(s) through one or more access points 105. In embodiments, an access point 105 can include a gateway, a cable modem, a wireless router including an embedded cable modem, a mobile hot-spot router, a multimedia over coaxial alliance (MoCA) node, a wireless extender, and any other device that is operable to route communications to and from a client device 110.

In embodiments, client devices 110 can include a wide variety of devices such as televisions, mobile devices, tablets, set-top boxes, computers, telephones, security devices, and any other device that is capable of utilizing a wireless video, data, telephony, or security service. In embodiments, an access point 105 can provide one or more service sets (e.g., primary service set(s) 115, subordinate service set(s) 120), and the service sets can be identified using unique service set identifiers (SSID) and/or an inclusion of an interworking informational element in an advertisement of the capabilities for the service set. For example, the access point 105 may advertise an available service set by outputting a radio signal including an SSID associated with the service set and other information that may be used by a client device 105 to join the service set. The primary service set(s) 115 may be used to deliver primary services (e.g., private, encrypted communications, gaming, video, home security, etc.), and the subordinate service set(s) 120 may be used to deliver subordinate services (e.g., public, unencrypted or encrypted network communications and other optional services).

In embodiments, the client devices 110 can identify a service set and can connect to a service set provided by the access point 105. The client device 110 may identify an appropriate service set, wherein the appropriate service set is one that is designated for providing a service requested by the client device 110 (e.g., home security services may be provided over a service set designated for home security services). In embodiments, once connected to a service set, a client device 110 can receive content and/or services from upstream networks or servers (e.g., wide area network (WAN) 125), and can communicate with other client devices 110 connected to the same service set if the service set is configured to allow such a communication.

In embodiments, an access point 105 can route communications between client device(s) 110 and a WAN 125 via a subscriber network 130. In embodiments, the subscriber network 130 can include various networks such as Ethernet (e.g., CAT5/CAT6), coaxial cable, optical fiber, twisted pair network, wireless networks including 4G and LTE, and others.

In embodiments, once joined to a service set offered by an access point 105, a client device 110 may communicate with the access point 105 over a wireless channel associated with the access point 105. For example, a requested service (e.g., data, video, telephony, home security, etc.) may be provided to a client device 110 using bandwidth available on the wireless channel. It will be appreciated by those skilled in the relevant art that with each additional client device 110 requesting a service through the access point 105, additional bandwidth on the wireless channel is consumed, and that the bandwidth consumed will vary with each service.

In embodiments, an access point 105 may monitor the utilization of a channel used by the access point 105 to communicate with one or more client devices 110. The utilization of the channel may be determined based on the bandwidth being consumed by services that are provided by the access point 105 over one or more service sets (e.g., primary service set(s) 115, subordinate service set(s) 120), co-channel interference created by co-existing access points (e.g., other access points that may be located in the same premise as the access point 105 or otherwise within close proximity to the access point 105) and other sources of noise, and channel utilization by external access points and wireless networks operating on the wireless channel. It should be understood that utilization of a channel associated with an access point 105 may be determined by a remote device or server (e.g., access point (AP) monitoring server 135).

Based on monitored channel utilization, the access point 105 may determine an amount of bandwidth that is available for the provisioning of subordinate services over one or more subordinate service sets 120. In embodiments, the bandwidth available for the provisioning of subordinate services over one or more subordinate service sets 120 can be equivalent to the maximum bandwidth available to the access point 105 less utilization of an associated channel caused by the provisioning of primary services over one or more primary service sets 115, co-channel interference created by co-existing access points and other sources of noise, and channel utilization by external access points and wireless networks.

In embodiments, when the bandwidth that is available for the provisioning of subordinate services drops below a predetermined threshold, the access point 105 may reduce support for one or more subordinate service sets 120. Support for one or more subordinate service sets 120 may be reduced by reducing a number of client devices 110 that are allowed to join a subordinate service set or by removing support for one or more subordinate service sets 120 entirely. Once network conditions improve (i.e., once the bandwidth available for subordinate services increases above a threshold level), the limits placed on the subordinate service sets 120 may be removed. For example, the access point 105 may resume support for the one or more subordinate service sets 120 and/or may increase the number of client devices 110 that are allowed to join a subordinate service or remove the client number restriction all together.

Figure 2:
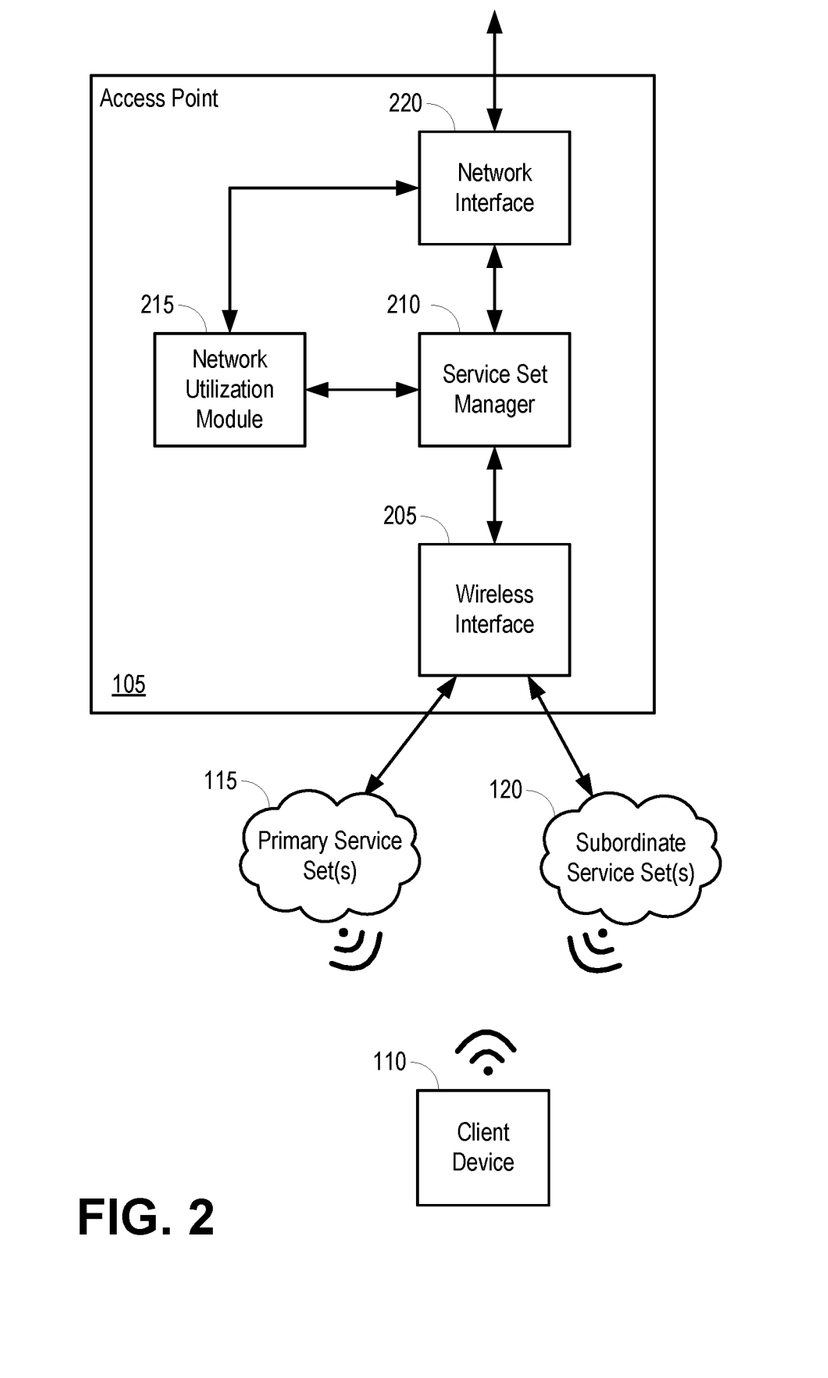
FIG. 2 is a block diagram illustrating an example access point operable to facilitate dynamic provisioning of subordinate service sets.

FIG. 2 is a block diagram illustrating an example access point 105 operable to facilitate dynamic provisioning of subordinate service sets. The access point 105 may include a wireless interface 205, a service set manager 210, a network utilization module 215, and a network interface 220. The access point 105 may provide one or more services to one or more client devices 110, and the one or more services may be received at the access point 105 from an upstream network or local network through the network interface 220. Communications between the access point 105 and one or more client devices 110 may be output from or received by the wireless interface 205. The wireless interface 205 may be tuned to output wireless communications and/or receive wireless communications through a specific wireless channel.

In embodiments, the access point 105 may route communications to and from client devices 110 through one or more service sets (e.g., primary service set 115, subordinate service set 120, etc.). One or more service sets may be designated for the provision of one or more services. For example, primary service set(s) 115 may be used by primary or preferred client devices 110 to access data, video, telephony, and/or home security services, and subordinate service set(s) 120 may be used to provide a guest or public network to be used by subordinate or guest devices.

In embodiments, a client device 110 may identify an available service set (e.g., through a SSID associated with a primary service set 115 or subordinate service set 120), and can attempt to join the identified service set. The service set manager 210 may receive requests from client devices 110 to join a service set, and the service set manager 210 may control whether the client devices 110 are allowed to join a requested service set.

In embodiments, a network utilization module 215 may monitor the utilization of a channel used by the access point 105 to communicate with one or more client devices 110. The network utilization module 215 may determine the utilization of a channel based on the bandwidth being consumed by services that are provided over one or more service sets (e.g., primary service set(s) 115, subordinate service set(s) 120), co-channel interference created by co-existing access points and other sources of noise, and channel utilization by external access points and wireless networks.

Based on monitored channel utilization, the network utilization module 215 may determine an amount of bandwidth that is available for the provisioning of subordinate services over one or more subordinate service sets 120. In embodiments, the bandwidth available for the provisioning of subordinate services over one or more subordinate service sets 120 can be equivalent to the maximum bandwidth available to the access point 105 less utilization of an associated channel caused by the provisioning of primary services over one or more primary service sets 115, co-channel interference created by co-existing access points and other sources of noise, and channel utilization by external access points and wireless networks.

In embodiments, when the bandwidth that is available for the provisioning of subordinate services drops below a predetermined threshold, the network utilization module 215 may reduce support for one or more subordinate service sets 120. Support for one or more subordinate service sets 120 may be reduced by reducing a number of client devices 110 that are allowed to join a subordinate service set or by removing support for one or more subordinate service sets 120 entirely.

In embodiments, the network utilization module 215 may reduce support for one or more subordinate service sets 120 by reducing a maximum number of client devices 110 that may join one or more of the subordinate service sets 120. For example, the service set manager 210 may control the number of client devices 110 accessing services over one or more subordinate service sets 120 according to a maximum number of client devices as determined by the network utilization module 215. The network utilization module 215 may determine a maximum number of client devices that are allowed to join one or more subordinate service sets based on various factors, including, but not limited to an expected or average bandwidth used for delivery of a subordinate service per client device, the difference between the amount of bandwidth available for the provisioning of subordinate services and the predetermined threshold bandwidth, and others.

In embodiments, the network utilization module 215 may reduce support for one or more subordinate service sets 120 by removing support for one or more subordinate service sets 120 entirely. For example, according to the determination made by the network utilization module 215, the service set manager 210 may temporarily cease the advertising of an SSID associated with a subordinate service set 120. When a plurality of subordinate service sets 120 are provided by an access point 105, the network utilization module 215 may make the determination that support for one or more of the plurality of subordinate service sets 120 is to be removed, and the determination may be based upon various factors, including, but not limited to an expected or average bandwidth consumed by each of the subordinate service sets 120, the number of client devices 110 previously, presently, or expected to be joined to each subordinate service set 120, priority levels given to the subordinate service sets 120, the difference between the amount of bandwidth available for the provisioning of subordinate services and the predetermined threshold bandwidth, and others.

Figure 3:
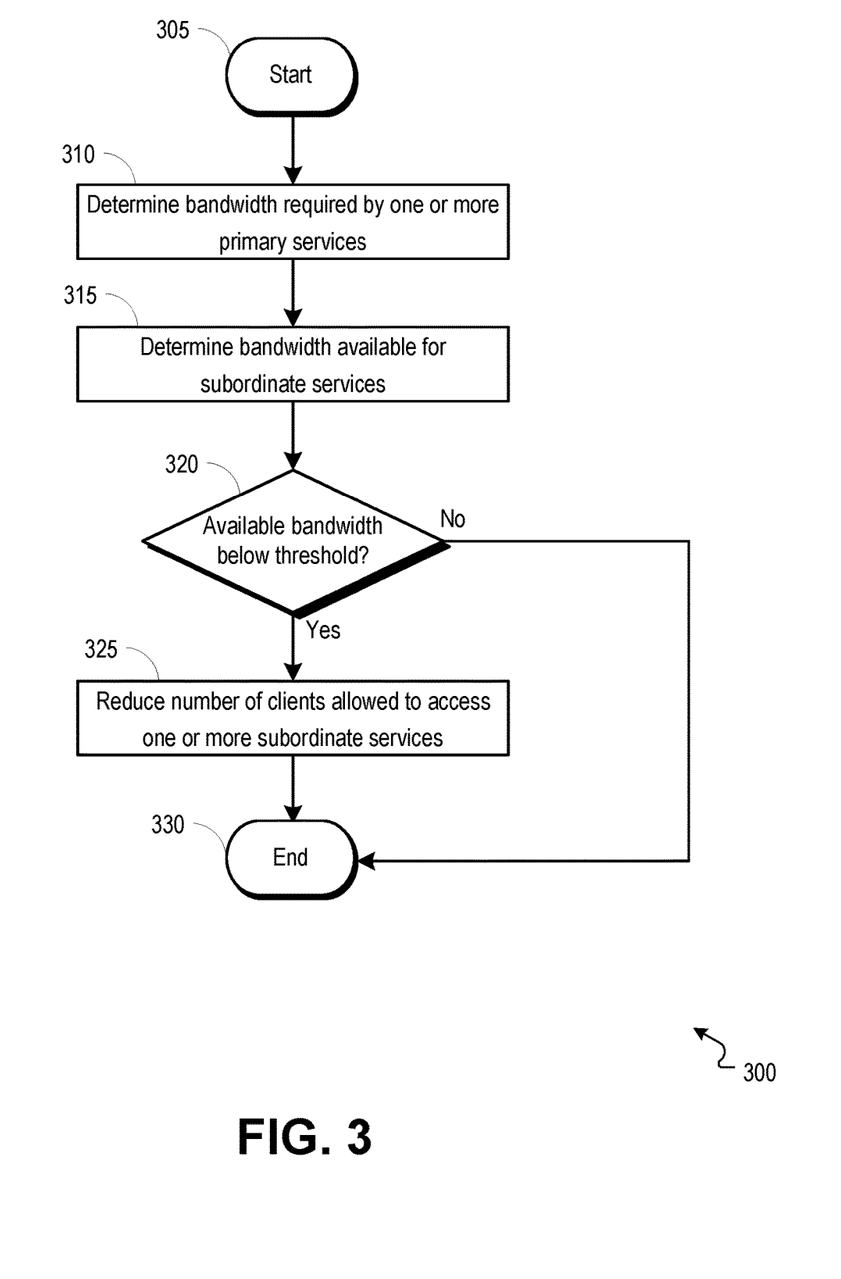
FIG. 3 is a flowchart illustrating an example process operable to facilitate dynamic provisioning of subordinate service sets by limiting the number of devices permitted to access the subordinate service sets.

FIG. 3 is a flowchart illustrating an example process 300 operable to facilitate dynamic provisioning of subordinate service sets by limiting the number of devices permitted to access the subordinate service sets. In embodiments, the process 300 may be carried out by an access point 105 of FIG. 1 or a remote server (e.g., cloud-based AP monitoring server 135 of FIG. 1). The process 300 may start at 305, when the utilization of a wireless network is sampled. The utilization of a wireless network may be sampled periodically or may be sampled conditionally. For example, the utilization of a wireless network may be sampled when a new client device joins the wireless network, or when a new client device joins a specific service set provided by a wireless network (e.g., primary service set 115 of FIG. 1, subordinate service set 120 of FIG. 1, etc.).

At 310, the bandwidth required by one or more primary services may be determined. The bandwidth required by one or more primary services may be determined, for example, by the access point providing the primary services (e.g., at a network utilization module 215 of FIG. 2). In embodiments, the network utilization module 215 may determine the bandwidth consumed by one or more primary services (e.g., private SSIDs, home security SSIDs, etc.).

At 315, the bandwidth available for subordinate services may be determined. The bandwidth available for subordinate services may be determined, for example, by the access point providing primary and/or subordinate services (e.g., at a network utilization module 215 of FIG. 2). In embodiments, the network utilization module 215 may determine the bandwidth available for subordinate services by finding the difference between a maximum bandwidth available to the access point or maximum bandwidth available on a channel used to provide one or more services and the bandwidth required for one or more primary services (e.g., the bandwidth required for one or more primary services as determined at 310). The network utilization module 215 may further consider co-channel interference created by co-existing access points and other sources of noise and may also consider channel utilization by external access points and wireless networks in the determination of the bandwidth available for subordinate services. For example, the network utilization module 215 may determine channel utilization by accounting for channel usage by each of one or more service sets offered by the access point, co-channel interference created by co-existing access points and other sources of noise, and channel utilization by external access points and wireless networks. The bandwidth available for subordinate services may be the difference between the determined channel utilization and the maximum bandwidth available to the access point or channel.

At 320, the determination may be made whether the bandwidth available for subordinate services is less than a threshold bandwidth. The determination whether the bandwidth available for subordinate services is less than a threshold bandwidth may be made, for example, by the access point providing the one or more primary and/or subordinate services (e.g., at the network utilization module 215). In embodiments, the access point may be pre-configured with a threshold bandwidth that may support one or more subordinate services. For example, the threshold bandwidth may be a bandwidth sufficient to provide one or more subordinate services to a certain number of client devices. The threshold bandwidth may be based upon a bandwidth requirement associated with one or more particular subordinate services that may be provided by the access point. It should be understood that the bandwidth threshold may be based on various other factors, and that the bandwidth threshold as configured at an access point may be modified.

If, at 320, the determination is made that the bandwidth available for subordinate services is less than a threshold bandwidth, the process 300 may proceed to 325. At 325, the number of client devices that are allowed to access one or more subordinate services may be reduced. The number of client devices allowed to access the one or more subordinate services may be reduced, for example, by the access point providing the one or more subordinate services (e.g., by the service set manager 210 of FIG. 2). In embodiments, the service set manager 210 of FIG. 2 may control the number of client devices (e.g., client devices 110 of FIG. 1) allowed to join a subordinate service set (e.g., subordinate service set 120 of FIG. 1). For example, the number of client devices allowed to join a subordinate service may be reduced until the bandwidth available for one or more subordinate services is no longer less than the predetermined threshold. As another example, the network utilization module 215 may determine a number of client devices that are allowed to join a subordinate service set. The number of client devices that are allowed to join a subordinate service set may be based upon an estimated or average amount of bandwidth consumed by each individual client device accessing the subordinate service set.

Returning to 320, if the determination is made that the bandwidth available for subordinate services is not less than a threshold bandwidth, the process 300 may end at 330.

Figure 4:
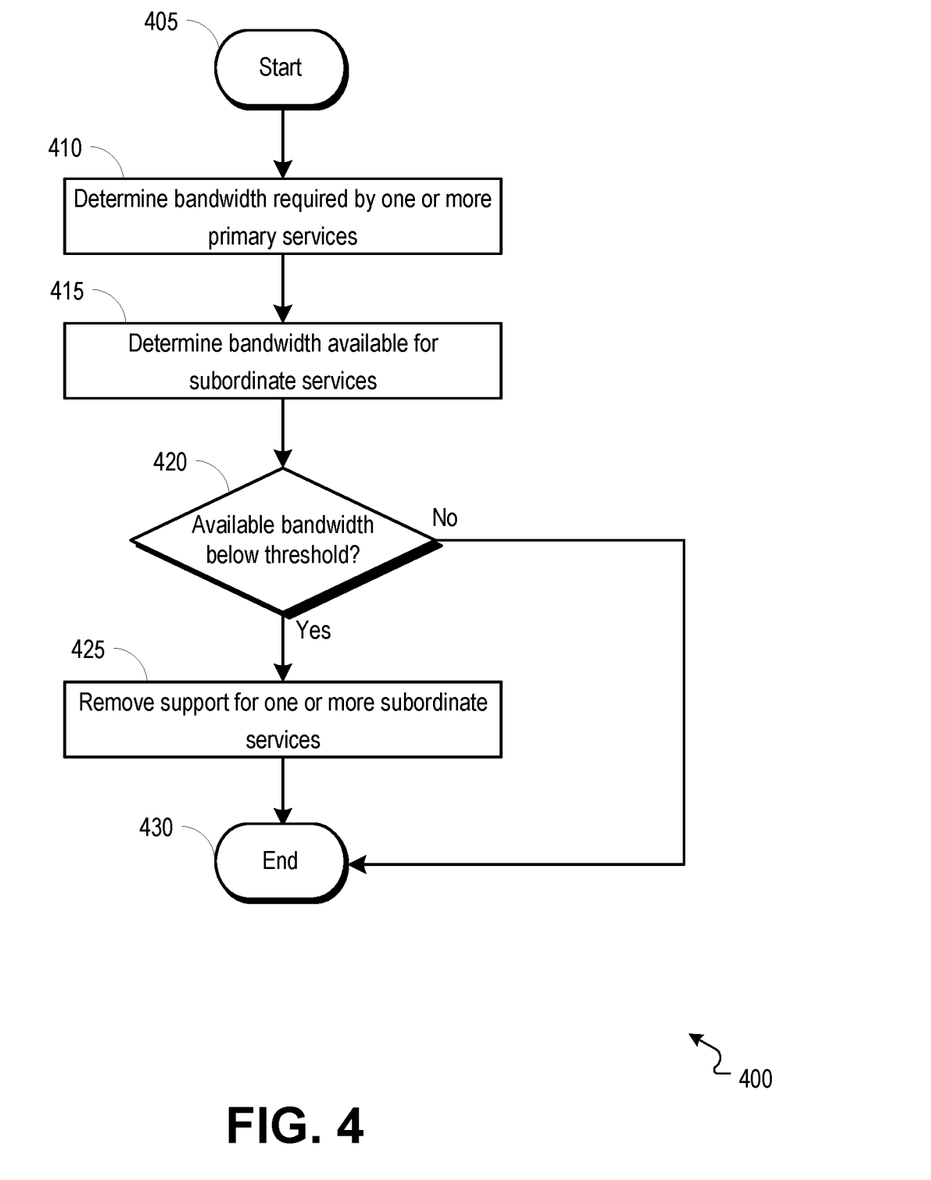
FIG. 4 is a flowchart illustrating an example process operable to facilitate dynamic provisioning of subordinate service sets by removing support for one or more subordinate service sets.

FIG. 4 is a flowchart illustrating an example process 400 operable to facilitate dynamic provisioning of subordinate service sets by removing support for one or more subordinate service sets. In embodiments, the process 400 may be carried out by an access point 105 of FIG. 1 or a remote server (e.g., cloud-based AP monitoring server 135 of FIG. 1). The process 400 may start at 405, when the utilization of a wireless network is sampled. The utilization of a wireless network may be sampled periodically or may be sampled conditionally. For example, the utilization of a wireless network may be sampled when a new client device joins the wireless network, or when a new client device joins a specific service set provided by a wireless network (e.g., primary service set 115 of FIG. 1, subordinate service set 120 of FIG. 1, etc.).

At 410, the bandwidth required by one or more primary services may be determined. The bandwidth required by one or more primary services may be determined, for example, by the access point providing the primary services (e.g., at a network utilization module 215 of FIG. 2). In embodiments, the network utilization module 215 may determine the bandwidth consumed by one or more primary services (e.g., private SSIDs, home security SSIDs, etc.).

At 415, the bandwidth available for subordinate services may be determined. The bandwidth available for subordinate services may be determined, for example, by the access point providing primary and/or subordinate services (e.g., at a network utilization module 215 of FIG. 2). In embodiments, the network utilization module 215 may determine the bandwidth available for subordinate services by finding the difference between a maximum bandwidth available to the access point or bandwidth available on a channel used to provide one or more services and the bandwidth required for one or more primary services (e.g., the bandwidth required for one or more primary services as determined at 410). The network utilization module 215 may further consider co-channel interference created by co-existing access points and other sources of noise and may also consider channel utilization by external access points and wireless networks in the determination of the bandwidth available for subordinate services. For example, the network utilization module 215 may determine channel utilization by accounting for channel usage by each of one or more service sets offered by the access point, co-channel interference created by co-existing access points and other sources of noise, and channel utilization by external access points and wireless networks. The bandwidth available for subordinate services may be the difference between the determined channel utilization and the maximum bandwidth available to the access point or channel.

At 420, the determination may be made whether the bandwidth available for subordinate services is less than a threshold bandwidth. The determination whether the bandwidth available for subordinate services is less than a threshold bandwidth may be made, for example, by the access point providing the one or more primary and/or subordinate services (e.g., at the network utilization module 215). In embodiments, the access point may be pre-configured with a threshold bandwidth that may support one or more subordinate services. For example, the threshold bandwidth may be a bandwidth sufficient to provide one or more subordinate services to a certain number of client devices. The threshold bandwidth may be based upon a bandwidth requirement associated with one or more particular subordinate services that may be provided by the access point. It should be understood that the bandwidth threshold may be based on various other factors, and that the bandwidth threshold as configured at an access point may be modified.

If, at 420, the determination is made that the bandwidth available for subordinate services is less than a threshold bandwidth, the process 400 may proceed to 425. At 425, support for one or more subordinate services may be removed. Support for one or more subordinate services may be removed, for example, by the access point offering the one or more subordinate services (e.g., by the service set manager 210). For example, the service set manager 210 may preclude the access point 105 from transmitting advertisement messages or responses to service queries received from client devices (e.g., beacons, probe requests, etc.). In embodiments, the service set manager 210 may temporarily suspend support for one or more subordinate service sets. The service set manager 210 may determine the number of subordinate service sets that are to be suspended based upon an amount of needed bandwidth and the amount of bandwidth consumed by each of the one or more subordinate service sets. The service set manager 210 may identify and designate one or more subordinate service sets for suspension of service based upon a priority level associated with each of a plurality of subordinate service sets. For example, the service set manager 210 may first select the lowest priority subordinate service set to be suspended.

Returning to 420, if the determination is made that the bandwidth available for subordinate services is not less than a threshold bandwidth, the process 400 may end at 430.

Figure 5:
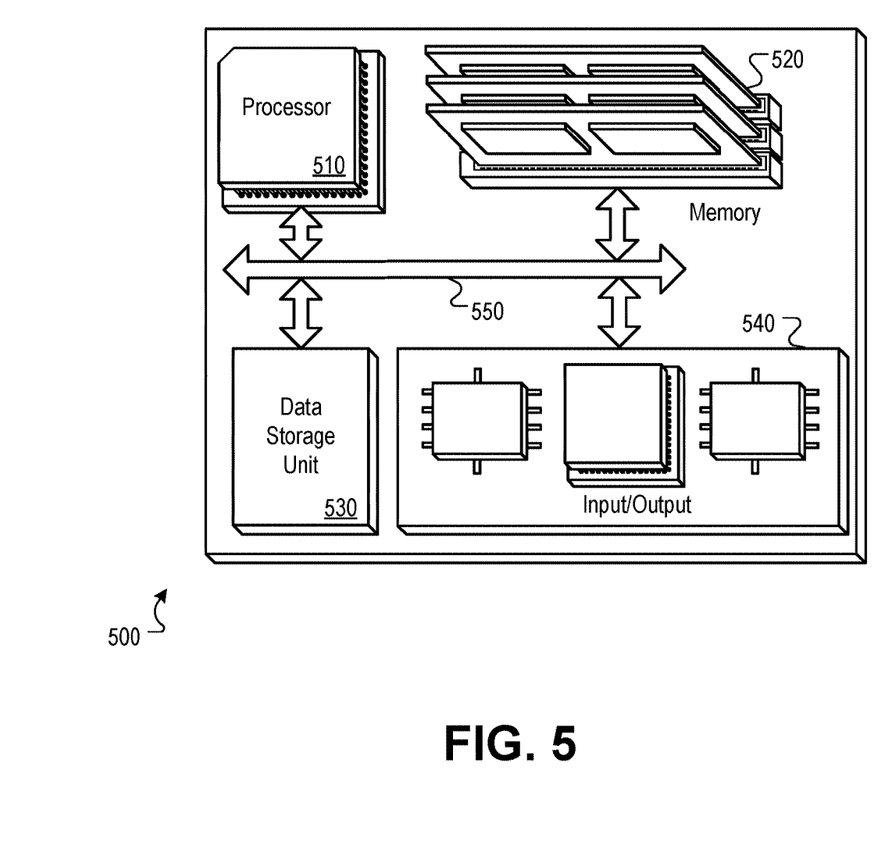
FIG. 5 is a block diagram of a hardware configuration operable to facilitate dynamic provisioning of subordinate service sets.

FIG. 5 is a block diagram of a hardware configuration 500 operable to facilitate dynamic provisioning of subordinate service sets. It should be understood that the hardware configuration 500 can exist in various types of devices. The hardware configuration 500 can include a processor 510, a memory 520, a storage device 530, and an input/output device 540. Each of the components 510, 520, 530, and 540 can, for example, be interconnected using a system bus 550. The processor 510 can be capable of processing instructions for execution within the hardware configuration 500. In one implementation, the processor 510 can be a single-threaded processor. In another implementation, the processor 510 can be a multi-threaded processor. The processor 510 can be capable of processing instructions stored in the memory 520 or on the storage device 530.

The memory 520 can store information within the hardware configuration 500. In one implementation, the memory 520 can be a computer-readable medium. In one implementation, the memory 520 can be a volatile memory unit. In another implementation, the memory 520 can be a non-volatile memory unit.

In some implementations, the storage device 530 can be capable of providing mass storage for the hardware configuration 500. In one implementation, the storage device 530 can be a computer-readable medium. In various different implementations, the storage device 530 can, for example, include a hard disk device, an optical disk device, flash memory or some other large capacity storage device. In other implementations, the storage device 530 can be a device external to the hardware configuration 500.

The input/output device 540 provides input/output operations for the hardware configuration 500. In embodiments, the input/output device 540 can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). In embodiments, the input/output device can include driver devices configured to send communications to, and receive communications from one or more networks (e.g., subscriber network 130 of FIG. 1, WAN 125 of FIG. 1, etc.) and/or one or more client devices (e.g., client devices 110 of FIG. 1) over one or more service sets (e.g., primary service set 115 of FIG. 1, subordinate service set 120 of FIG. 1, etc.). It should be understood that the communications protocols described herein are only examples and that various other inter-chip communication protocols may be used to support the methods, systems, and computer readable media described herein.

Those skilled in the art will appreciate that the invention improves upon methods and apparatuses for allocating resources to service sets. The methods, systems, and computer readable media described herein can be operable to facilitate dynamic provisioning of subordinate service sets. An access point providing primary service(s) and subordinate service(s) may determine the bandwidth available for the subordinate service(s) based on current channel utilization. Where the bandwidth available for the subordinate service(s) is determined to be less than a predetermined threshold, the access point may modify support for the subordinate service(s). The access point may reduce the number of clients allowed to access the subordinate service(s) or may temporarily suspend offering of the subordinate service(s) to client devices.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of nonvolatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
    determining a maximum bandwidth available to an access point;
    determining a bandwidth consumed by the access point in the provisioning of primary services over one or more primary service sets;
    determining an available bandwidth for subordinate services, wherein subordinate services are provided to one or more devices over one or more subordinate service sets that are supported by the access point, the one or more subordinate service sets being designated for the provisioning of subordinate services, wherein the available bandwidth for subordinate services is determined based upon a difference between the maximum bandwidth available to the access point and the bandwidth consumed by the access point in the provisioning of primary services over the one or more primary service sets;
    comparing the available bandwidth for subordinate services to a predetermined threshold bandwidth; and
    if the available bandwidth for subordinate services is less than the predetermined threshold bandwidth, modifying support provided by the access point for one or more of the subordinate service sets.

2. The method of claim 1, wherein modifying support for one or more of the subordinate service sets comprises:
    reducing the number of client devices that are allowed to join one or more of the subordinate service sets.

3. The method of claim 2, wherein the number of client devices allowed to join one or more subordinate service sets is determined based upon the difference between the available bandwidth for subordinate services and the predetermined threshold bandwidth, and is further based upon an average bandwidth consumption by a client device accessing a subordinate service.

4. The method of claim 1, wherein modifying support for one or more of the subordinate service sets designated for the provisioning of subordinate services comprises:
    suspending support for one or more of the subordinate service sets.

5. The method of claim 4, wherein suspending support for one or more of the subordinate service sets comprises:
    suspending the transmission of advertisement messages comprising one of more service set identifiers associated with one or more of the subordinate service sets.

6. The method of claim 1, further comprising:
    determining a level of interference on a wireless channel being used by the access point to deliver services to one or more devices; and
    wherein the determination of the available bandwidth for subordinate services is further based upon the level of interference on the wireless channel.

7. The method of claim 1, wherein the determination of the available bandwidth for subordinate services is made at a server upstream from the access point offering the one or more subordinate service sets.

8. An apparatus comprising:
    one or more interfaces configured to be used to transmit and receive communications delivered over one or more subordinate service sets designated for the provisioning of subordinate services and communications delivered over one or more primary service sets designated for the provisioning of primary services; and
    one or more modules configured to:
    determine a maximum total available bandwidth;
    determine an amount of bandwidth utilized in the provisioning of primary services over the one or more primary service sets;
    determine an available bandwidth for delivering the subordinate services to one or more client devices, wherein the available bandwidth for subordinate services is determined based upon a difference between the maximum total available bandwidth and the bandwidth utilized in the provisioning of primary services over the one or more primary service sets;

compare the available bandwidth for delivering the subordinate services to a predetermined threshold bandwidth; and if the available bandwidth for delivering the subordinate services is less than the predetermined threshold bandwidth, modify support for one or more of the subordinate service sets.

9. The apparatus of claim 8, wherein modifying support for one or more of the subordinate service sets comprises:

reducing the number of client devices that are allowed to join one or more of the subordinate service sets designated for the provisioning of subordinate services.

10. The apparatus of claim 9, wherein the number of client devices allowed to join the one or more subordinate service sets is determined based upon the difference between the available bandwidth for subordinate services and the predetermined threshold bandwidth, and is further based upon an average bandwidth consumption by a client device accessing a subordinate service.

11. The apparatus of claim 8, wherein modifying support for one or more of the subordinate service sets comprises:

suspending support for one or more of the subordinate service sets.

12. The apparatus of claim 11, wherein suspending support for one or more of the subordinate service sets comprises:

suspending the transmission of advertisement messages comprising one of more service set identifiers associated with one or more of the subordinate service sets.

13. The apparatus of claim 8, wherein determining the available bandwidth for subordinate services comprises:

determining a level of interference on a wireless channel being used to deliver the primary services and the subordinate services to the one or more client devices; and wherein the determination of the available bandwidth for subordinate services is further based upon the level of interference on the wireless channel.

14. One or more non-transitory computer readable media having instructions operable to cause one or more processors to perform the operations comprising:

determining a maximum bandwidth available to an access point;

determining a bandwidth consumed by the access point in the provisioning of primary services over one or more primary service sets;

determining an available bandwidth for subordinate services, wherein subordinate services are provided to one or more devices over one or more subordinate service sets that are supported by the access point, the one or more subordinate service sets being designated for the provisioning of subordinate services, wherein the available bandwidth for subordinate services is determined based upon a difference between the maximum bandwidth available to the access point and the bandwidth consumed by the access point in the provisioning of primary services over the one or more primary service sets;

comparing the available bandwidth for subordinate services to a predetermined threshold bandwidth; and if the available bandwidth for subordinate services is less than the predetermined threshold bandwidth, modifying support provided by the access point for one or more of the subordinate service sets.

15. The one or more non-transitory computer-readable media of claim 14, wherein modifying support for one or more of the subordinate service sets comprises:

reducing the number of client devices that are allowed to join one or more of the subordinate service sets.

16. The one or more non-transitory computer-readable media of claim 15, wherein the number of client devices allowed to join one or more of the subordinate service sets is determined based upon the difference between the available bandwidth for subordinate services and the predetermined threshold bandwidth, and is further based upon an average bandwidth consumption by a client device accessing a subordinate service.

17. The one or more non-transitory computer-readable media of claim 14, wherein modifying support for one or more of the subordinate service sets comprises:

suspending support for one or more of the subordinate service sets designated for the provisioning of subordinate services.

18. The one or more non-transitory computer-readable media of claim 17, wherein suspending support for one or more of the subordinate service sets comprises:

suspending the transmission of advertisement messages comprising one of more service set identifiers associated with one or more of the subordinate service sets.

19. The one or more non-transitory computer-readable media of claim 14, wherein determining the available bandwidth for subordinate services comprises:

determining a level of interference on a wireless channel being used by the access point to deliver services to one or more devices; and wherein the determination of the available bandwidth for subordinate services is further based upon the level of interference on the wireless channel.

20. The one or more non-transitory computer-readable media of claim 14, wherein the determination of the available bandwidth for subordinate services is made at a server upstream from an access point offering the one or more subordinate service sets.

* * * * *